Oct. 11, 1966  K. T. BALL  3,277,710
NET OIL METER
Filed Dec. 4, 1963
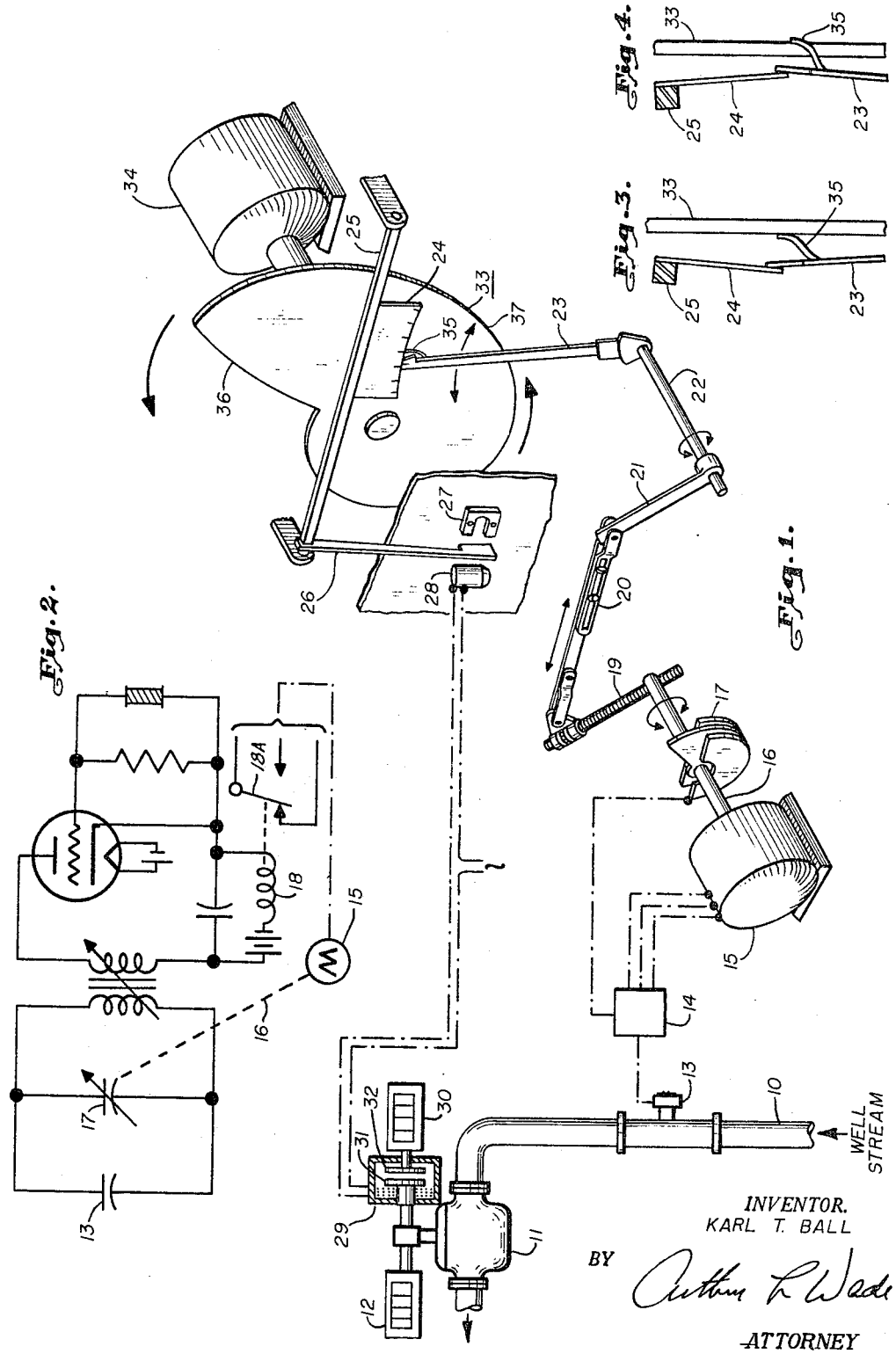
INVENTOR.
KARL T. BALL
BY Arthur L. Wade
ATTORNEY 3,277,710
NET OIL METER
Karl T. Ball, Tulsa, Okla., assignor to National Tank Company, Tulsa, Okla., a corporation of Nevada
Filed Dec. 4, 1963, Ser. No. 329,605
3 Claims. (Cl. 73—233)

This is a continuation-in-part of copending application S.N. 106,903, filed May 1, 1961, now abandoned.

The present invention relates to measuring the volume of oil well production. More particularly, the invention relates to determining the amount of water and the amount of oil in the production from an oil well.

Production of an oil well often contains varying amounts of water and an emulsion of oil and water along with oil. Production can be separated into its water and oil components and the volumes of these components separately measured. However, if separation equipment is not available, some means responsive to the variable ratio of oil and water must be utilized as the production is flowed to a gathering system to determine these different quantities.

A system is needed to continuously manifest, indicate and/or record the amount of oil produced by a particular well under field conditions. The amount of water may be desirably manifested, as well, but basically an operator requires the net oil of his production for economic operation of his property. A simple, rugged system, suitable for this field operation, is needed to continuously supply an operator with this information.

Gunst et al. 2,720,624 discloses a system which can be used to respond to the capacitance value of oil well production. This capacitance value has been found to vary in proportion to the water in the oil of the production. The present problem is to incorporate this Gunst system into a simple, rugged, practical system which will provide an indication and/or recordation of the total volume of the production of an oil well and the net volume of oil of the production for use by the operator.

A principal object of the present invention is to provide an indication and/or recordation of the total volume of fluids produced from an oil well and subtract therefrom a value representing the total volume of water in the production.

Another object is to transduce the capacitance value of oil well production into a series of electrical pulses whose lengths are proportional to the amount of oil in the production and indicate and/or record the integration of these pulses.

The present invention provides a system responsive to the capacitance value of oil well production which gives an element a mechanical movement over a predetermined range. The position of the element within the range is used to generate a series of electrical pulses which are used to energize a clutch between a register and a positive displacement meter in order to couple the register to the positive displacement meter for a period of time which will cause the register to manifest the amount of oil in the total oil well production fluids passing through the meter.

Other objects, advantages and features of this invention will become apparent to one skilled in the art upon consideration of the written specification, appended claims, attached drawings, wherein;

FIG. 1 is a schematic illustration, partly in isometric, illustrating the essential components of a complete system in which the invention is embodied;

FIG. 2 is a schematic illustration of the circuit directly responsive to the dielectric of the oil well production;

FIG. 3 is a side view of the cam with a mechanical element of the system in a first of two positions; and FIG. 4 is a side view of the cam with the mechanical element of the system in the second of two positions.

GENERAL SYSTEM

FIG. 1 illustrates the general system in which the present invention is embodied. A pipe line 10 is illustrated as carrying the production of an oil well. The present invention is embodied in a system which measures the total fluids passing through the pipe line 10 and subtracts the water in the production from the measurement of total fluids.

TOTAL FLUID MEASUREMENT

Presumably, the production in conduit 10 is passing from a specific property into a gathering system for processing. As the production fluids pass through conduit 10, their volume is measured by a positive displacement meter 11. The primary element of positive displacement meter 11 is indicated as mechanically connected, by a shaft, to continuously operate a register 12. Therefore, register 12 gives a continuous manifestation of the total amount of fluids passed through conduit 10. The present system is embodied around the concept of coupling a second register to the mechanism actuating the first register that part of the time the first register is actuated which is representative of the proportion of oil in the production passing through conduit 10. The system for carrying out this coupling function is energized in a series of pulses in the time of total fluid measurement at a constant rate, controlled by probe 13 as a primary element.

A capacitance element, referred to as a probe, is inserted into the fluids of conduit 10 at 13 upstream of the turbulence created by the positive displacement meter. Probe 13 is indicated as electrically incorporated into a circuit within an instrument at 14. The instrument circuit within 14 controls the rotation of motor 15. As motor 15 rotates, it turns shaft 16 on which is mounted a variable capacitance unit 17. Capacitance unit 17 is also indicated as electrically included in the circuit of instrument 14.

CIRCUIT OF INSTRUMENT 14

The essential features of the electric circuit within instrument 14 are illustrated in FIG. 2. Electrical symbols have been utilized to represent probe 13, motor 15 and variable capacitance 17. More specifically, FIG. 2 shows probe 13 as a capacitance, connected in the plate circuit of the vacuum tube which characterizes this circuit.

Gunst et al. 2,720,624 discloses and claims the circuit as an oscillating crystal-controlled vacuum-tube circuit with the probe as a condenser connected in the resonant portion of the circuit. A grid resistor is made high enough in value that oscillations of the circuit are sustained at substantially zero capacity values of the condenser probe 13.

Coil 18 of a solenoid is connected in the plate circuit of the vacuum tube. Changes in the capacitance of the fluids to which condenser-probe 13 is responsive energizes solenoid coil 18 to actuate switch 18A from one to the other of alternate positions.

Two-position switch 18A controls the direction of rotation of motor 15. Motor 15, in turn, mechanically rotates shaft 16 to position condenser 17 to bring the circuit to a null balance. The ultimate function of the FIG. 2 circuit, therefore, is to rotate shaft 16 to various positions within a range of capacitance values representative of varying amounts of water in the fluids passing through conduit 10.

LINKAGE BETWEEN SHAFT 16 AND THE CAM

FIG. 1 is partially drawn in isometric to give clarity as to how shaft 16 positions the linkage 19, 20, 21 and shaft 22 is rotated through its range of positions. Adjustment of the mechanical linkage is illustrated by showing link 20 having an adjustable length. Further, link 19 is illustrated as threaded for a fixture on the end of link 20 to be placed at varying distances from the axis of shaft 16. The specific adjustments disclosed merely represent the many arrangements which can be provided to develop the relative ranges of motion required between shaft 16 and shaft 22.

On shaft 22 there is mounted a cam-contacting arm 23. Arm 23 is mounted from one of its ends to extend at right angles to the axis of shaft 22. As shaft 22 rotates, arm 23 moves through an angular range of movement which is indicated by scale 24.

Particular note is to be made of the fact that arm 23 is moved through its angular range by rotation of shaft 22 while being flexed from its free end. The free end is given alternate positions on a line parallel to the axis of shaft 22. A cam is provided to contact the free end of arm 23 and flex arm 23 in positioning the free end from one to the other of two alternate positions. This cam-arm 23 cooperation will be developed infra.

SWITCH ACTUATION

Scale 24 is provided to both indicate the angular positions of flexing, cam-contacting arm 23, and to function as part of the linkage system with which the cam-generated motion of the arm end is transmitted. In order to transmit motion of the cam positioned free end of arm 23, scale 24 is mounted rigidly upon rotating bar 25. An arm 26 is fixed to, and depended from, one end of bar 25. Arm 26 is carried from one to another of two positions as bar 25, scale 24 and the end of arm 23 are carried from one to the other of their two positions by the cam.

The depending, or free, end of arm 26 is utilized to divert the flux of a magnet 27. Magnet 27 normally directs its flux to hold switch 28 in an open position. However, when the depending, free end of arm 26 is brought between magnet 27 and switch 28, the flux of magnet 27 is diverted through the arm 26 and switch 28 will have its contacts closed.

ENERGIZED ELECTRIC CIRCUIT

An electric circuit is arranged to include switch 28 and is also connected to a suitable source. A coil of a solenoid clutch 29 is also included in this circuit, protected from dirt, debris and corrosive vapors by a housing 29A. Clutch 29 is mechanically positioned between the actuating shaft of positive displacement meter 11 and register 30 and spring urged to disengage meter 11 and register 30. When the electric circuit is completed through switch 28, clutch 29 is energized, the clutch spring is overcome and plates 31 and 32 are held together in order for register 30 to be actuated by positive displacement meter 11. When the total time meter 11 is actuated by the total fluids passing through meter 11 at a constant rate is broken into increments, and the electric circuit is completed the portion of those increments proportional to the oil-water ratio of the total fluids, register 30 will accumulate the portions in terms of net oil in the production metered.

CAM GENERATED PULSES

Returning to a consideration of the mechanical linkage, arm 23 is seen as arranged for simultaneous rotation by shaft 22 and flexture by cam 33. Motor 34 rotates cam 33 at a constant speed. The plane of cam 33 is positioned relative to rider 35 on the end of arm 23 so that the leading edge 36 of the cam will engage the rider 35 and move it up on the surface of cam 33. As cam 33 rotates, rider 35 will be supported on the cam surface the distance from the edge 36 to trailing edge 37. In this general manner, as cam 33 rotates, the linkage system of scale 24, bar 25 and arm 26 is carried from one to the other of two positions by the rotation of cam 33.

In engineering the system in which the invention is embodied, the range of movement given rider 35 on flexing arm 23 is coordinated with the shape of cam 33 between its leading and trailing edges to provide for flux-controlling arm 26 to complete the circuit with switch 28 and generate the electrical impulses with its circuit for a series of intervals whose lengths are proportional to the oil in the fluids in conduit 10. Obviously, the cam 33 is consistently shaped to provide a longer path along its surface for rider 35 as arm 23 is rotated toward the center of rotation of cam 33. When the cam 33, between its leading edge 36 and trailing edge 37, is properly shaped, register 30 will produce the manifestation of the amount of water in any total quantity of fluids passing through meter 11 at a constant rate.

FIG. 3 and FIG. 4 illustrate the two positions to which the free end of arm 23 is carried. FIG. 3 specifically shows rider 35 as having contacted leading cam edge 36. Rider 35 has been lifted up upon the surface of cam 33 and bar 25 has been rotated by scale 24. FIG. 4, of course, illustrates the relative position of bar 25, scale 24, arm 23, rider 35 and cam 33 after cam 33 has rotated far enough that rider 35 has dropped off of the trailing edge 37.

The disclosed arrangement provides energization of the electric circuit by switch 28 in pulses whose lengths are proportional to the amount of oil in the fluids flowing through conduit 10 at a constant rate. The result is an actuation of register 30, or other manifesting devices, to total up the pulses as an integration of the amount of oil in the production fluids.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:
1. A metering system for measuring the amount of oil in production liquids from a well, including,
   a conduit passing the total flow of liquids from a well and into a gathering system at a constant rate,
   a positive displacement meter in the conduit and continuously responsive to the total flow of liquids in the conduit,
   a first register mechanically actuated by the positive displacement meter to exhibit the total flow of production,
   a second register for exhibit of the quantity of oil in the production,
   a capacitance element mounted in the conduit and inserted into the liquids upstream of the turbulence created by the positive displacement meter,
   an electric network including the capacitance element so as to be responsive to the dielectric of the total liquids and produce an electrical signal proportional to the quantity of oil in the production,
   an electric motor responsive to the electrical signal of the network to actuate a capacitance element of the network which will bring the network to a null balance,
   mechanical linkage arranged to be positioned by the motor within a range of movement proportional to a predetermined range of oil quantity in the production,
   a cam rotated at constant speed and shaped to position the linkage from one to the other of alternate positions of which the duration in a first of the alternate positions is proportional to the quantity of oil in the production, an electric circuit energized by the linkage in the first of the positions, a clutch mechanically positioned between the register and the second positive displacement meter and electrically connected to the electric circuit to mechanically engage the second register with the positive displacement meter when the electric circuit is energized and therefore for only the period of time which is directly proportional to the quantity of oil in the production, and a protective housing about the clutch to shield the clutch parts from the dirt and debris and corrosive vapors of oil field production.

2. A metering system for measuring the amount of oil in production liquids from a well, including, a conduit passing the total flow of liquids from a well and into a gathering system at a constant rate, a positive displacement meter in the conduit and continuously responsive to the total flow of liquids in the conduit, a first register mechanically actuated by the positive displacement meter to exhibit the total flow of production, a second register for exhibit of the quantity of oil in the production, a capacitance element mounted in the conduit and inserted into the liquids upstream of the turbulence created by the positive displacement meter, an electric network including the capacitance element so as to be responsive to the dielectric of the total liquids and produce an electrical signal proportional to the quantity of oil in the production, an electric motor responsive to the electrical signal of the network to actuate a capacitance element of the network which will bring the network to a null balance, a flexing link arm pivoted from one end by the electric motor over the range of motion required to bring the network to a null balance, a cam rotated at a constant speed and positioned in relation to the flexed free end of the flexing link to move the free end from one position to another, the free end being held in one of the two positions for a period of time in both positions proportional to the amount of oil in the production, means connected to the flexing free end of the link for closing a switch during the period of time the free end of the link is held in one of the two positions, an electric circuit energized by the switch when the switch is closed, a clutch mechanically positioned between the register and the second positive displacement meter and electrically connected to the electric circuit to mechanically engage the second register with the positive displacement meter when the electric circuit is energized and therefore for only the period of time which is directly proportional to the quantity of oil in the production, and a protective housing about the clutch to shield the clutch parts from the dirt and debris and corrosive vapors of oil field production.

3. A metering system for measuring the amount of oil in production liquids from a well, including, a conduit passing the total flow of liquids from a well and into a gathering system at a constant rate, a positive displacement meter in the conduit and continuously responsive to the total flow of liquids in the conduit, a first register mechanically actuated by the positive displacement meter to exhibit the total flow of production, a second register for exhibit of the quantity of oil in the production, a capacitance element mounted in the conduit and inserted into the liquids upstream of the turbulence created by the positive displacement meter, a vacuum-tube crystal-controlled oscillating circuit connected to the capacitance element by the resonant portion of the circuit and with an adjustable capacitance arranged parallel with the capacitance element, a solenoid coil energized by the plate circuit, a motor-control circuit actuated by the solenoid coil, a motor rotated in two different directions by the switch actuation, a mechanical link from the motor to the adjustable capacitance with the arrangement wherein the motor is rotated to adjust the capacitance to continuously re-establish null balance of the circuit, a flexing link attached by one end to the mechanical link from the motor so as to rotate its free end over a range representative of the oil in the production to which the capacitance element is responsive, means for converting the positions of the free end of the flexing link in its range into electrical pulses whose lengths are representative of the quantity of oil in the production, a clutch mechanically positioned between the register and the second positive displacement meter and electrically connected to the means for converting the positions of the free end of the flexing link into electrical pulses to mechanically engage the second register with the positive displacement meter for the lengths of the electrical pulses and therefore for only the period of time which is directly proportional to the quantity of oil in the production, and a protective housing about the clutch to shield the clutch parts from the dirt and debris and corrosive vapors of oil field production.

References Cited by the Examiner
UNITED STATES PATENTS

| | | | |
|---|---|---|---|
| 2,088,568 | 8/1937 | Beecher | 235—61 |
| 2,617,299 | 11/1952 | Ennis et al. | 72—233 X |
| 3,006,189 | 10/1961 | Warren et al. | 73—194 |

RICHARD C. QUEISSER, *Primary Examiner.*